United States Patent [19]
Komiya et al.

[11] Patent Number: 4,964,977
[45] Date of Patent: Oct. 23, 1990

[54] CROSS-FLOW TYPE COOLING TOWER

[75] Inventors: Jujiro Komiya, Fujisawa; Tadanobu Muto, Tokyo, both of Japan

[73] Assignee: Shinwa Sangyo Company, Ltd., Tokyo, Japan

[21] Appl. No.: 334,554

[22] Filed: Apr. 7, 1989

[30] Foreign Application Priority Data

Apr. 8, 1988 [JP] Japan .................. 63-86935

[51] Int. Cl.$^5$ .............................. B01F 3/04
[52] U.S. Cl. .................... 261/130; 261/137; 261/147; 261/156; 261/153; 261/DIG. 77; 261/DIG. 11; 165/900; 165/78
[58] Field of Search ............... 261/DIG. 77, DIG. 11, 261/130, 137, 147, 156, 153; 165/900, 78

[56] References Cited

U.S. PATENT DOCUMENTS

| | | | |
|---|---|---|---|
| 2,612,351 | 9/1952 | Jones | 165/78 |
| 2,615,687 | 10/1952 | Simmons | 165/78 |
| 3,782,451 | 1/1974 | Cates | 261/DIG. 77 |
| 3,794,304 | 2/1974 | Cates et al. | 261/DIG. 77 |
| 3,820,353 | 6/1974 | Shiraishi et al. | 261/DIG. 77 |
| 3,865,911 | 2/1975 | Beferre | 261/DIG. 77 |
| 3,923,935 | 12/1975 | Cates | 261/DIG. 77 |
| 4,003,970 | 1/1977 | Vodicka | 261/DIG. 77 |
| 4,474,232 | 10/1984 | Wright | 165/78 |
| 4,655,977 | 4/1987 | Komiya et al. | 165/900 |
| 4,682,472 | 7/1987 | Huard | 165/78 |

FOREIGN PATENT DOCUMENTS

| | | |
|---|---|---|
| 52-26044 | 2/1977 | Japan ............... 261/DIG. 77 |
| 53-36857 | 9/1978 | Japan . |
| 61-173077 | 8/1986 | Japan . |

Primary Examiner—Tim Miles
Attorney, Agent, or Firm—Oblon, Spivak, McClelland, Maier & Neustadt

[57] ABSTRACT

A cross-flow type cooling tower comprises a cooling tower main body, a water tank placed at the upper part of the main body, a plurality of closed type heat exchanging units arranged in the main body in substantially horizontal manner and in parallel to each other in multi-stage below the water tank, a supplying header placed near an air discharge opening of the main body, which is detachably connectable to supplying ports of the heat exchanging units, a discharge header placed near an air intake opening of the main body, which is detachably connectable to discharge ports of the heat exchanging units, wherein the water tank is divided into a first water receiving part near the air intake opening and a second water receiving part near the air discharge opening by way of a partition wall, and a switching valve is provided at at least a water feeding pipe to the second water receiving part.

12 Claims, 6 Drawing Sheets

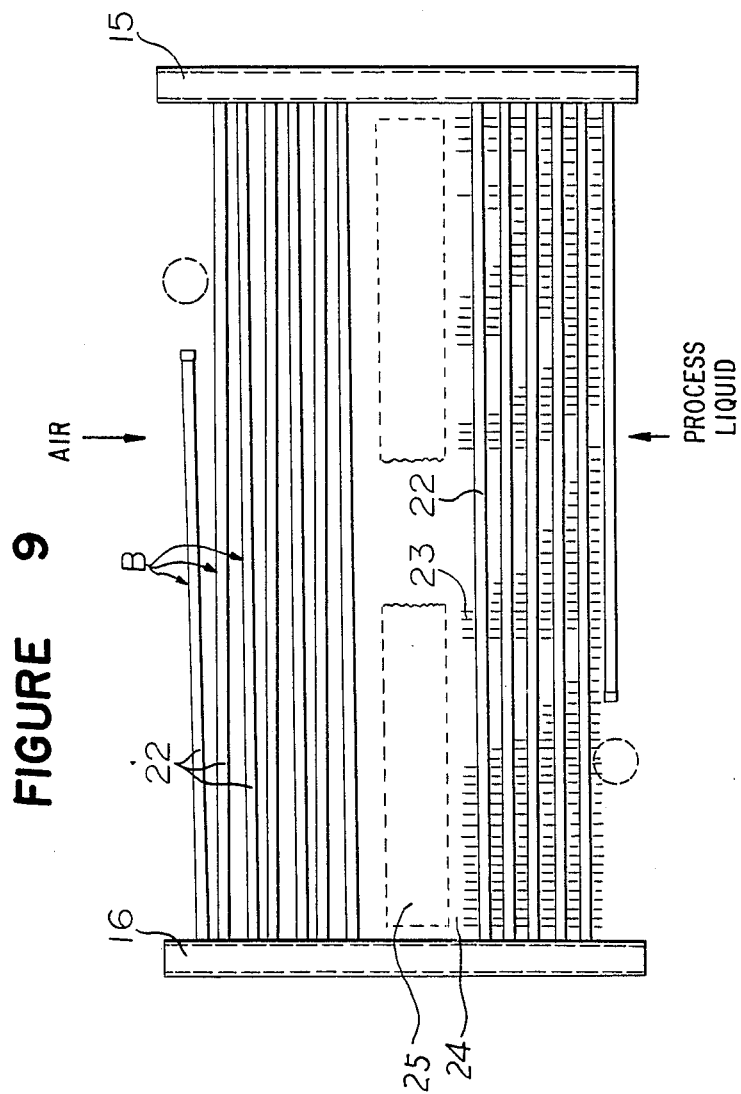

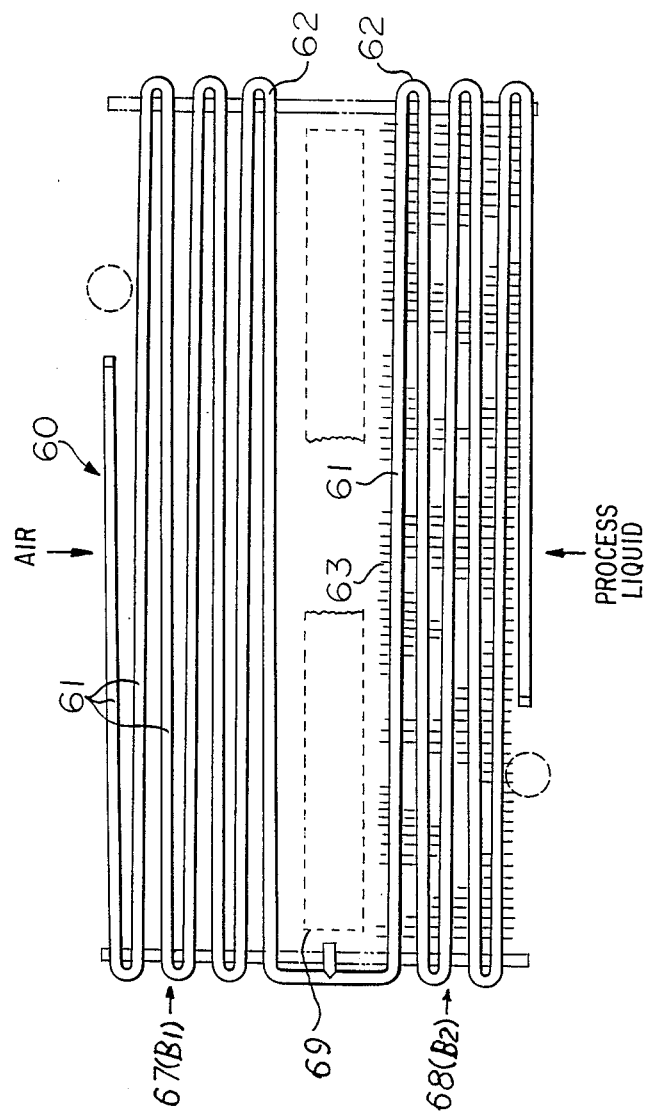

CROSS-FLOW TYPE COOLING TOWER

BACKGROUND OF THE INVENTION

1. Field of the Invention

The present invention relates to a cross-flow type cooling tower wherein a plurality of closed type heat exchanging units are arranged in a cooling tower main body in a substantially horizontal manner and in parallel to each other in a multi-stage, and the cooling liquid supply port and the cooling liquid discharge port of each of the heat exchanging units are respectively connected to a common supply header and a common discharge header.

2. Discussion of Background

Various types of cooling towers have been proposed and developed. The inventors of this application proposed a cooling tower such a type that a plurality of linear pipes arranged in parallel to each other are sequentially connected by U-shaped pipes to form a zig-zag passage; thus forming a coil-like closed type heat exchanging unit; the cooling liquid supply port of each of the heat exchanging units is connected to a commonly used supply header, and the cooling liquid discharge port of each of the units is connected to a commonly used discharge header in Japanese Unexamined Patent Publication No. 173077/1986. Japanese Examined Utility Model Publication No. 36857/1978 also discloses such cooling tower.

The conventional cross-flow type cooling tower is so adapted that cooling water falls on the entire region of the closed type heat exchanging units from a water tank placed at the upper part of the cooling tower main body at a uniform flow rate irrespective of ambient temperature. Accordingly, in winter season or at a low ambient temperature, an amount of water to be splashed is excessive because it is unnecessary to increase the capacity of cooling as required in summer season, and therefore, useless power is consumed to operate a pump.

In winter season, a white smoke is apt to produce. In a town, a white smoke interrupts light of a traffic signal near a place where a cooling tower is installed, this causing a traffic trouble. Further, a habitant may recognize the white smoke to be red smoke when the white smoke is reflected by neon sign and notifies a fire to a fire department.

SUMMARY OF THE INVENTION

It is an object of the present invention to provide a cross-flow type cooling tower to eliminate production of a white smoke even in winter season.

The foregoing and other objects of the present invention have been attained by providing a cross-flow type cooling tower which comprises a cooling tower main body, a water tank placed at the upper part of the main body, a plurality of closed type heat exchanging units arranged in the main body in a substantially horizontal manner and in parallel to each other in multi-stage below the water tank, a supplying header placed near an air discharge opening of the main body, which is detachably connectable to supplying ports of the heat exchanging units, a discharge header placed near an air intake opening of the main body, which is detachably connectable to discharge ports of the heat exchanging units, wherein the water tank is divided into at least two parts: a first water receiving part near the air intake opening and a second water receiving part near the air discharge opening by means of a partition wall, and a switching valve is provided at at least a water feeding pipe to the second water receiving part.

In the present invention, a switching valve is provided in a water feeding pipe to the first water receiving part in addition to the switching valve provided in the water feeding pipe to the second water receiving part.

The surface area of the bottom of the first water receiving part is about twice as large as that of the second water receiving part.

The switching valve for the second water receiving part may be an electromagnetic valve operable in response to temperature at the outlet of a water tank placed at the lower part of the cooling tower main body.

An eliminator may be disposed in the heat exchanging units arranged in multi-stage so as to extend in the vertical direction below the partition wall for dividing the water tank into the first and second water receiving parts.

The cooling tower of the present invention may be so constructed that the supplying port and the discharge port of each of the closed type heat exchanging units are respectively formed by linear connection types; the cooling liquid distributing pipes of each of the heat exchanging units have linear pipe portions extending between the supplying port and the discharge port, the linear pipe portions being arranged perpendicular to the linear connection pipes; and each of the linear connection pipes at both sides of each of the heat exchanging units are detachably supported by respective supporting rails which are attached to side walls of the cooling tower main body in a substantially horizontal manner in multi-stage with certain intervals therebetween.

Each of the supporting rails may be made of a channel-like material with both opened ends, in the longitudinal direction, to allow insertion or withdrawal of the linear connection pipes which constitute the supplying port and the discharge port of each of the heat exchanging units, and both longitudinal edges of the channel-like material are inwardly bent to form a slit portion which serves to support the connecting part of each of the linear connection pipes.

The linear connection pipe may be in a form of a box in cross section or in a form of a cylinder.

The supporting rails are arranged with their axe aligned and with a distance at opposing side walls of the main body so that the linear connection pipes at both sides of the heat exchanging units are supported.

The supporting rails support only the connecting portions of the linear connection pipes and the cooling liquid distributing pipes without any contact with the outer circumferential surface of the linear connection pipes.

A plate-like wet packing materials are interposed in each space formed between the adjacent closed type heat exchanging units arranged in multi stage, the lateral sides of the space being defined by the eliminator and the air intake opening.

A number of fins are formed on the outer circumferential surface of the linear portion of the cooling liquid distributing pipes of each of the closed type heat exchanging units which are between the eliminator and the air discharge port.

BRIEF DESCRIPTION OF DRAWING

A more complete appreciation of the invention and many of the attendent advantages thereof will be readily obtained as the same becomes better understood by reference to the following detailed description when considered in connection with the accompanying drawings, wherein:

FIG. 9 is a plan front view of another embodiment of the closed type heat exchanging unit used for the cooling tower of the present invention; and FIG. 10 is a plan front view of another embodiment of the closed type heat exchanging unit used for the cooling tower of the present invention.

DETAILED DESCRIPTION OF PREFERRED EMBODIMENT

Figure 1:
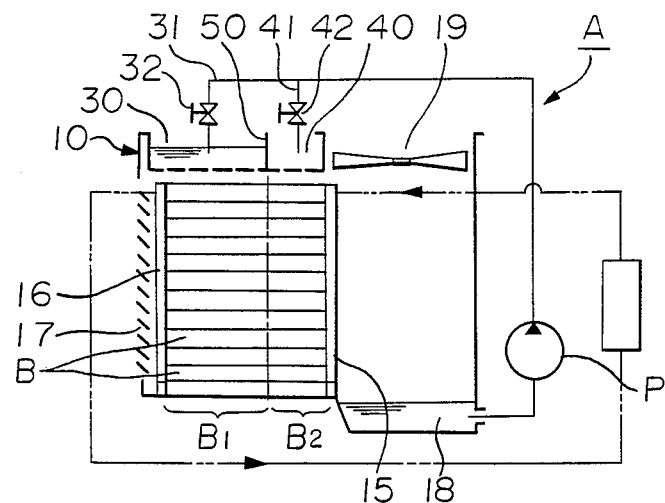
FIG. 1 is a diagram of an embodiment of the cross-flow type cooling tower according to the present invention.

Several embodiments of the cross-flow type cooling tower of the present invention will be described with reference to the drawings, wherein the same reference numerals designate the same or corresponding parts.

In FIG. 1, a cross-flow type cooling tower A includes a plurality of closed type heat exchanging units B in a substantially horizontal manner in multi stage below a water tank 10 placed at the upper part of the cooling tower A. The supplying ports and the discharge ports of the closed type heat exchanging units B are respectively detachably connected to a commonly used supply header 15 and a commonly used discharge header 16. The discharge header 16 is placed near an air intake opening 17 of the cooling tower A, and the supplying header 15 is placed near the air discharge opening 19.

The water tank 10 is divided into two sections: a first water receiving part 30 near the air intake opening 17 and a second water receiving part 40 near the air discharge opening 19 by means of a partition wall 50. A water feeding pipe 31 with a switching valve 32 is provided for the first water receiving part 30 and a water feeding pipe 41 with a switching valve 42 is provided for the second water receiving part 40.

The supplying port and the discharge port of each of the closed type heat exchanging units B placed in multistage in the cooling tower A are respectively constituted by linear connection pipes 20, 21. The linear connection pipes 20, 21 for the supplying port and the discharge port are in parallel to and spaced apart to each other. A plurality of linear treating water distributing pipes 22 are arranged in parallel to each other and in perpendicular to the linear connection pipes 20, 21 provided at both sides of each of the heat exchanging units B.

The linear connection pipes 20, 21 provided at both sides of the heat exchanging units B are respectively detachably supported by respective supporting rails 14 which are attached to both side plates of the cooling tower main body 12 in a substantially horizontal manner and with certain spaces in the vertical direction.

Each of the linear connection pipes 20, 21 is so arranged that the axial line of the linear connection pipe 20 or 21 is substantially parallel to a stream of air flowing from the air intake opening 17 to the air discharge opening 19. In the embodiment as shown in FIG. 1, each of the closed type heat exchanging units B are detachably supported by the rails 14 attached to the side walls 13 of the cooling tower main body 12 in multistage wherein the supplying port of each of the heat exchanging units is lower in position than the discharge port of each of the heat exchanging units, i.e. in a inclined state.

One end portion of each of the linear connection pipes 20, 21 of the heat exchanging units is closed and the other end is communicated with the supplying header 15 or the discharge header 16 by means of a connecting means such as a union joint in a disconnectable manner.

Figure 5:
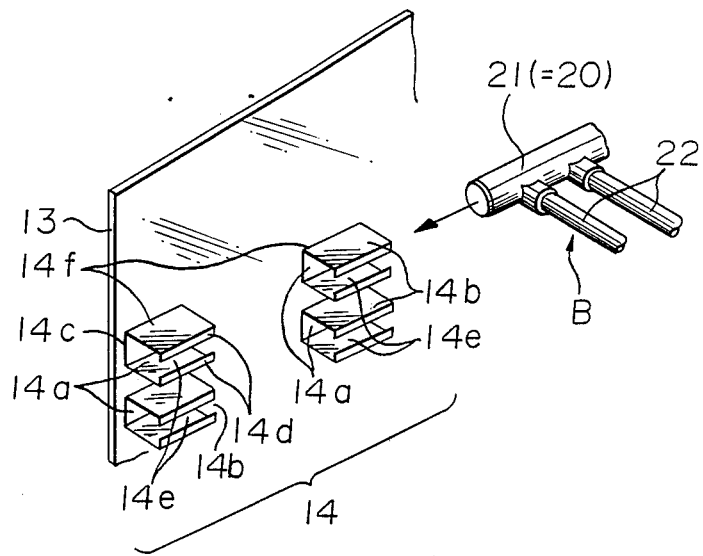
FIG. 5 is a perspective view partly broken showing supporting rails used for the cooling tower of the present invention.

The linear treating water distributing pipes 22 of each of the closed type heat exchanging units B are so arranged that they are in parallel to the longitudinal direction of the air intake opening 17 which is provided at a right angle to the side walls 13 of the cooling tower main body 12, namely, in perpendicular to the air flow taken through the air intake opening 17 (FIG. 5).

Each of the supporting rails 14 is made of a channel-like material with both openings 14a, 14b in the longitudinal direction, which have dimensions sufficient to allow insertion or withdrawal of the linear connection pipes 20 of each of the heat exchanging units B. The bottom portion 14 C of the channel-like rail 14 is attached to the side wall 13 of the main body 12 by welding and the longitudinal edges of the channel-like rail 14 are inwardly bent to form a pair of raised portions 14d, whereby a slit portion 14e is formed along the entire length of the rail 14 so that the connecting portion of the linear connection pipe 21 and the distributing pipe 22 can be supported.

The linear connection pipe 20 or 21 to be supported by the rail 14 is in a form of a circle in cross section.

Figure 3:
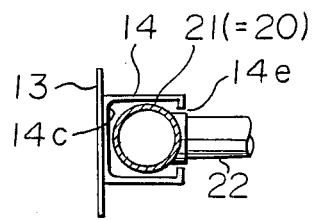
FIG. 3 is an enlarged cross-sectional view of a part of the heat exchanging unit as shown in FIG. 2.

The linear connection pipe 20 or 21 is supported by the rail 14 in a non-contact state (FIG. 3).

Figure 4:
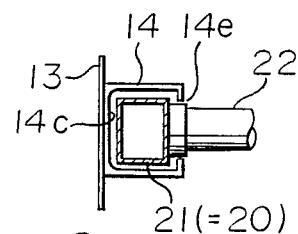
FIG. 4 is an enlarged cross-sectional view of another embodiment of the part of the heat exchanging unit used for the cooling tower of the present invention.

The shape of the linear connection pipe 20 or 21 may be a form of box as shown in FIG. 4.

Four rail pieces 14 are used to support each of the closed type heat exchanging units so that the linear connection pipes 20, 21 provided at both sides of the heat exchanging unit are respectively supported by the four rail pieces which are arranged in the container with certain spaces in their axial direction aligned in a disconnectable manner.

FIG. 9 is a front view showing another embodiment of the closed type heat exchanging unit B wherein the same reference numerals designate the same or corresponding parts. The heat exchanging unit B has a space at the intermediate portion 24 for receiving an eliminator 25. Further, a large number of fins 23 are formed on the outer circumferential surface of the distributing pipes 22 at the portion below the second water receiving part 40. A plate-like wet packing material may be interposed between the adjacent heat exchanging units which are vertically arranged in the cooling tower at an area defined by the eliminator and the air intake opening 17 of the cooling tower main body 12.

The cooling tower according to the first embodiment of the present invention functions as follows. When the cooling tower is used in the seasons other than winter, the first and second water receiving parts 30, 40 are used.

Treating liquid in the closed type heat exchanging units B received in the cooling tower main body 12 in multi-stage by means of the rails 14 attached to the opposing side walls 13 flows as follows.

The treating liquid supplied from a load portion (such as a refrigerator, an air conditioner) to the common supplying header 14 is distributed to the linear connection pipes at the supplying side of each of the closed type heat exchanging units B. The liquid uniformly flows in the distributing pipes 22 of the heat exchanging units. The treating liquid is indirectly contacted with sprayed water falling from the water tank 10 while the treating liquid flows through the distributing pipes 22 to effect heat exchanging by the function of latent heat. The treating water cooled by heat exchanging flows into the common discharge header 16 through the linear connection pipes 21 at the discharge port side of each of the heat exchanging units B, and is supplied to the load at which there is temperature rise in the treating water by work. Then, the water is returned to the supplying header 15 for circulation. On the other hand, when the switching valves 32, 42 are fully opened, the sprayed water is sprayed on the heat exchanging units B from the bottom of the water tank 10. The sprayed water crossingly comes in contact with the air stream taken through the air intake opening 17 into the cooling tower main body 12, whereby the water is more or less cooled by the latent heat, and at the same time, the sprayed water indirectly cools the treating water flowing in the heat exchanging units B. Thus, by effecting the above-mentioned heat exchanging repeatedly between the treating water in the heat exchanging units B and the air flow, the treating water is cooled to a predetermined temperature; the sprayed water is temporarily stored in the water tank 18 at the lower part of the cooling tower A; then, it is returned to the water tank 10 at the upper part of the cooling tower by means of a pump, and is sprayed on the heat exchanging units B again.

In winter season, the switching valve 42 for the second water receiving part 40 is closed, accordingly, the sprayed water is supplied from the bottom of the first water receiving part 30 onto a first portion B1 of each of the heat exchanging units B, the first portion B1 being located near the air intake opening 17. No sprayed water is supplied onto a second portion B2 of each of the heat exchanging units B located just below the second water receiving part 40 and near the air discharge opening 19. Accordingly, air taken through the air intake opening 17 directly comes in contact with the sprayed water to thereby cool the water by the function of latent heat, while the temperature of air itself rises. Then, the air is passed through the first portion B1 and the second portion B2 of each of the heat exchanging units B subsequently. At the second portion which is located below the second water receiving part 40, the air indirectly comes to contact with the treating water which has just been fed from the load portion through the supplying header 15 to the heat exchanging units B and is still high temperature condition, whereby the temperature of the air is further increased. The air having a relatively high temperature and a low relative humidity is directed to the air discharge opening 19, during which the air does not become super-saturated air. Thus, the air is discharged to the atmosphere without causing a white smoke.

In periodical cleaning, maintenance or repairing of the heat exchanging unit B, the linear connection pipes 20, 21 are disconnected from the headers 15, 16, and each of the heat exchanging units B is pulled out in its axial direction to remove it from the main body 12.

Figure 6:
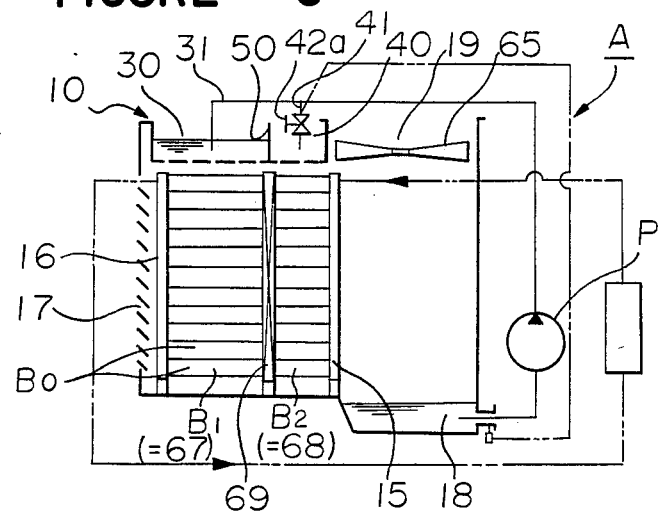
FIG. 6 is a diagram of another embodiment of the cross flow type cooling tower of the present invention.
Figure 2:
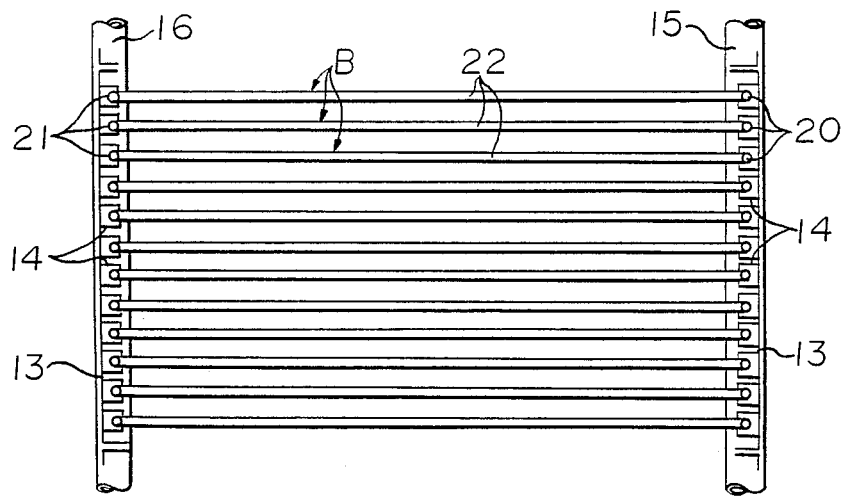
FIG. 2 is a front view of an embodiment of the closed type heat exchanging unit used for the cooling tower of the present invention.
Figure 7:
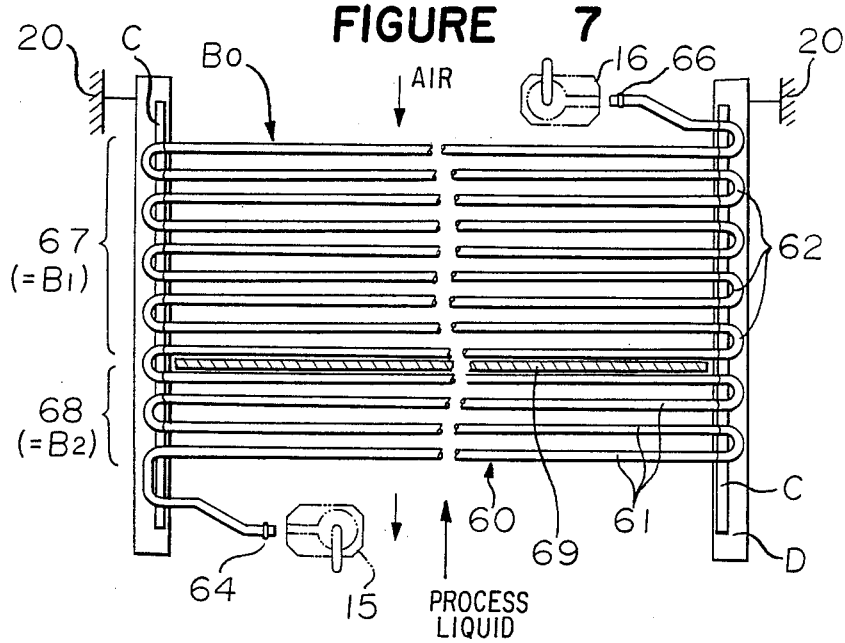
FIG. 7 is a plan view of another embodiment of the closed type heat exchanging unit used for the cooling tower as shown in FIG. 6.
Figure 6A:
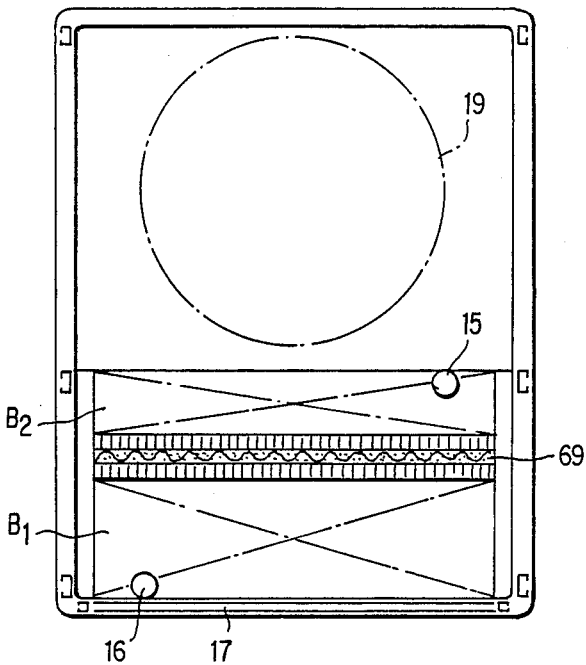
FIG. 6A is a horizontal cross-sectional view of FIG. 6.

FIGS. 6, 7 and 10 show another embodiment of the cooling tower according to the present invention, wherein the same reference numerals as the first embodiment designate the same or corresponding parts. Accordingly, only different structural elements and the function will be described.

Each of closed type heat exchanging units B0 is composed of a heat exchanging coil 60 which comprises a plurality of linear pipes 61 extending in parallel to each other and a plurality of U-shaped curved pipes to connect each one end of the two linear pipes to thereby form a zig zag path for treating liquid. A pair of commonly used spacers C which are fitted to the linear pipes 61 are made of a thin material of vinyl chloride and are formed to have a ⊃-shape in cross section. By means of the spacers C, the linear pipes 61 are supported in parallel to and spaced part from each other with a predetermined distance. The position of the spacers C is so determined as to cover all joint portions of the linear pipes 61 and the curved pipes 62.

Figure 8:
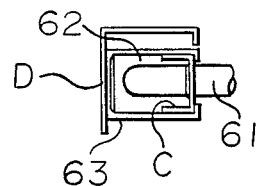
FIG. 8 is a side view showing a spacer used for the cooling tower of the present invention.

The cooling tower main body has a pair of opposing supporting frames D. Spacer receiving members 63 are vertically arranged with certain distances on the opposing supporting frames D by means of channel members having a shape of ⊏ in cross section, the number of the spacer receiving members 63 corresponding to the number of the heat exchanging coils 30. Further, the spacer receiving members 63 are also arranged in a substantially horizontal manner in the direction of width of each of the supporting frames D (FIG. 8). Each of the spacers C having a shape of ⊃ in cross section is received in each of the spacer receiving members so that the both outer side surfaces of the spacer C are restricted by both inner side surfaces of the space receiving members 63 having a shape of ⊏ in cross section. accordingly, the linear pipes 61 and the curved pipes 62 of each of the heat exchanging coils 60 can be supported by the pair of opposing supporting frames D through the spacers C so as to be substantially horizontal and in multi-stage without contacting the supporting frames D.

The treating liquid supplying port 64 of each of the heat exchanging coils 60 is directed at the side of a blower 65 of the cooling tower A, and a discharge port 66 of it is directed to the side of air intake opening 17. The supplying ports 64 and the discharge ports 66 are respectively connected to a common supplying header 15 and a discharge header 16, which are vertically positioned in the cooling tower A, by means of union joints. The heat exchanging coils 60 having the same shape are arranged vertically in the cooling tower A, and an eliminator 69 of a plate-like shape are vertically extended at the position just below a partition wall 50 in the water tank 10 so that the eliminator 69 separates area of the heat exchanging coils 60 into a first portion 67 (B1) and a second portion 68 (B2).

An electromagnetic valve is used for a switching valve 42a provided in a feeding pipe 41 for the second water receiving part 40 in the water tank 10 so that it is opened and closed in response to the temperature of water at the outlet of a water tank 18 provided at the lower part of the cooling tower A.

FIG. 10 is a plan view of another embodiment of the heat exchanging coil used for the cooling tower of the present invention. An intermediate portion of the coil 60 is adapted to receive the eliminator 69, and the linear pipes 61 extending between the eliminator 69 and the air discharge opening are respectively provided with a large number of fins 63. In this embodiment, a packing material may be inserted between the adjacent heat exchanging coils vertically arranged in their first portions 67 (B1). The function of the second embodiment of the present invention in summer and the intermediate season except winter is the same as that of the above-mentioned embodiment. The function of the second embodiment in winter season is the same as that of the above mentioned embodiment except for the function of the eliminator 69. Namely, when the cross-flow type cooling tower in which the eliminator 69 is provides between the first and second portions 67, 68 of the closed type heat exchanging units, i.e. the position below the partition wall 50 of the first and second water receiving parts 30, 40 is operated in the winter season, sprayed water falling from the first water receiving part 30 falls on the first portion 67 of the heat exchanging units and tends to flow toward the air discharge opening 19 along with a stream of air sucked through the air intake opening 17. However, the movement of the water drop to the second portion is hindered by the eliminator 69 so that the second portion 68 of the heat exchanging units does not become wet, whereby the temperature of air passing therethrough can be elevated.

In the above-mentioned first and second embodiments, since the position of the linear connection pipes 20 of each of the closed type heat exchanging units B is lower than that of the linear connection pipe 21 so that each of the heat exchanging units B is inclined, the treating liquid can be completely drained from the heat exchanging units B when they are not used to thereby avoid freezing of water in winter season.

In the cross-flow type cooling tower of the present invention, by closing the switching valve provided in the water feeding pipe for the second water receiving part in winter season, supply of sprayed water to the second portion of the heat exchanging units can be stopped. In this case, air introduced through the air intake opening indirectly cools the treating water in the heat exchanging units at the side of the discharge header, and the temperature of the air itself is elevated. The air directly comes to contact with the sprayed water to have relatively high humidity. Then, indirect heat exchanging is effected at the second portion between the air and the treating liquid having a high temperature which is fed into the heat exchanging units from the supplying header. By the heat exchanging, the treating liquid is cooled while the temperature of air is elevated and at the same time the relative humidity of the air is reduced. Thus, when the air is discharged through the air discharge opening, the air does not become super-saturated air, and there is produced no white smoke. The treating liquid cooled by heat exchanging is further cooled by both the air and sprayed water at the side of the air intake opening of the heat exchanging units. A suitable amount of the treating water can be supplied to a load portion without spraying water from the bottom of the water tank onto the heat exchanging units in summer season. Further, an amount of water to be sprayed in winter can be reduced in comparison with summer season. As a result, power to operate a pump can be saved.

A rate of feeding water to each of the water receiving parts can be adjusted by operating the switching valves for the water receiving parts in any season.

A flow rate of sprayed water for heat exchanging can be assured in winter season.

The switching valve for the second water receiving part is opened and closed in response to the temperature of the outlet of the water tank placed at the lower part of the cooling tower. Accordingly, supply and stop of water to the second water receiving part can be controlled in consideration that the temperature of the treating liquid to the load portion is low or the temperature of the treating water is high.

In the cross-flow type cooling tower of the present invention, the eliminator is placed in the vertical direction to separate the areas of the heat exchanging units into the first portion and the second portion. Accordingly, water drops of the sprayed water scattered at the first portion of the heat exchanging units can not reach the second portion thereof, whereby there is no possibility that the water drops deposit on the heat exchanging units in the second portion. Further, the temperature of air, which temperature has been reduced at the first portion to thereby increase relative humidity can be effectively elevated by the second portion of the heat exchanging units in a dry state. Accordingly, discharge air does not produce a white smoke.

In the cross-flow type cooling tower of the present invention, both ends of the linear distributing pipes of each of the heat exchanging units are respectively connected to linear connection pipes at the supplying side and the discharge side. Accordingly, the heat exchanging units can be simple and easily assembled without using conventional U-shaped pipes. The treating liquid can be uniformly distributed from the linear connection pipes at the supply side to the parallel-arranged linear distributing pipes and collected at the linear connection pipes at the discharge side to be supplied to the load portion. Accordingly, loss in pressure head of the treating liquid in the heat exchanging units can be reduced, and equipments for the treating liquid can be small-sized. Since the linear connection pipes are detachably connected to each of the heat exchanging units, the heat exchanging units can be easily removed from the cooling tower when the cleaning and repairing of the units are carried out. Further, the number of heat exchanging units can be increased or decreased in accordance with requirements of the capacity of the cooling tower.

Since the linear connection pipes provided at both sides of each of the heat exchanging units are supported by the supporting rails provided at the opposing side walls of the cooling tower main body in a freely detachable manner, there is caused no vibration of the heat exchanging units by a stream of air passing therethrough to thereby operate the cooling tower without noises.

The connecting parts of the linear connection pipes and the linear distributing pipes are supported by the supporting rails having a ⊃-shape in cross section at their slit portions formed in the entire length of the axial direction of the supporting rails, whereby the heat exchanging units can be smoothly inserted or withdrawn from the cooling tower main body.

The shape of the linear connection pipes in cross section is circle, and the outer circumferential surface of the linear connection pipes does not come in contact with inner wall surface of the supporting rails, whereby there is no risk of causing a galvanic phenomenon even when the linear connection pipes is made of a metal different from the material of the supporting rails, and there is no possibility of producing pin holes in the linear connection pipes.

When the supporting rail is formed by a plurality of rail pieces, an amount of material used for the supporting rail can be reduced and it is possible to obtain a smooth flow of air and sprayed water.

Each of the heat exchanging units may be provided with a large number of fins at the side of the air discharge opening, whereby efficiency of cooling of the treating liquid can be increased in summer season, and efficiency of heating air taken from the air intake opening to the discharge opening can be increased to thereby prevent a white smoke from producing in water.

Obviously, numerous modifications and variations of the present invention are possible in light of the above teachings. It is therefore to be understood that within the scope of the appended claims, the invention may be practiced otherwise than as specifically described herein.

What is claimed is:

1. A cross-flow type cooling tower which comprises: a cooling tower main body,
a water tank placed at the upper part of the main body,
a plurality of closed type heat exchanging units arranged in the main body in a substantially horizontal manner and in parallel to each other in multistage below the water tank,
a supplying header placed near an air discharge opening of the main body, which is detachably connectable to supplying ports of the heat exchanging units,
an intake header placed near an air discharge opening of the main body, which is detachably connectable to discharge ports of the heat exchanging units, wherein the water tank is divided into at least two parts: a first water receiving part near the air intake opening and a second water receiving part near the air discharge opening by means of a partition wall, and a switching valve is provided at at least a water feeding pipe to the second water receiving part.

2. The cross-flow type cooling tower according to claim 1, wherein a switching valve is provided in a water feeding pipe to the first water receiving part in addition to the switching valve provided in the water feeding pipe to the second water receiving part.

3. The cross flow type cooling tower according to claim 1, wherein the surface area of the bottom of the first water receiving part is twice as large as that of the second water receiving part.

4. The cross flow type cooling tower according to claim 1, wherein the switching valve for the second water receiving part is an electromagnetic valve operable in response to temperature at the outlet of a water tank placed at the lower part of the main body.

5. The cross-flow type cooling tower according to claim 1, wherein an eliminator is placed in the heat exchanging units arranged in multi stage so as to extend in the vertical direction below the partition wall for dividing the water tank into the first and second water receiving parts so as to separate splashed water.

6. The cross-flow type cooling tower according to claim 1, wherein a number of fins are formed on cooling liquid distributing pipes of each of the heat exchanging units below the second water receiving part.

7. The cross-flow type cooling tower according to claim 1, wherein the supplying port and the discharge port of each of the heat exchanging units are respectively formed by linear connection pipes; the cooling liquid distributing pipes of each of the heat exchanging units have linear pipe portions extending between the supplying port and the discharge port, the linear pipe portions being arranged perpendicular to the linear connection pipes; and each of the linear connection pipes at both sides of each of the heat exchanging units are detachably supported by respective supporting rails which are attached to side walls of the cooling tower main body in a substantially horizontal manner in multistage with certain intervals therebetween.

8. The cross-flow type cooling tower according to claim 7, wherein the supporting rails support only the connecting portions of the linear connection pipes and the cooling liquid distributing pipes without any contact with the outer circumferential surface of the linear connection pipes.

9. The cross-flow type cooling tower according to claim 7, wherein the supporting rail is made of a channel-like material with both opened ends, in the longitudinal direction, to allow insertion or withdrawal of linear connection pipes which constitute the supplying port and the discharge port of each of the heat exchanging units, and both longitudinal edges of the channel-like material are inwardly bent to form a slit portion which serves to support the connecting part of each of the linear connection pipes to the linear portion of each of the cooling liquid distributing pipes.

10. The cross-flow type cooling tower according to claim 9, wherein the shape of the linear connection pipe in cross section is a form of box.

11. The cross-flow type cooling tower according to claim 9, wherein the shape of the linear connection pipe in cross section is a form of cylinder.

12. The cross flow type cooling tower according to claim 9, wherein the supporting rails are arranged with their axes aligned and with a distance at opposing side walls of the main body so that the linear connection pipes at the both sides of each of the heat exchanging units are supported.

* * * * *